US012796714B2

(12) United States Patent
Sagalowicz et al.

(10) Patent No.: US 12,796,714 B2
(45) Date of Patent: Nov. 17, 2026

(54) PALATABILITY ENHANCEMENT OF DRY PET FOODS BY FAT MODIFICATION

(71) Applicant: Société des Produits Nestlé S.A., Vevey (CH)

(72) Inventors: Laurent Sagalowicz, Blonay (CH); Isaac N.A. Ashie, Ballwin, MO (US); Mark Ambuhl, Enney (CH); Brian David Craft, Lausanne (CH); Elena Diamanti, Ecublens (CH)

(73) Assignee: Société des Produits Nestlé S.A., Vevey (CH)

( * ) Notice: Subject to any disclaimer, the term of this patent is extended or adjusted under 35 U.S.C. 154(b) by 454 days.

(21) Appl. No.: 18/468,954

(22) Filed: Sep. 18, 2023

(65) Prior Publication Data

US 2024/0108031 A1 Apr. 4, 2024

Related U.S. Application Data

(60) Provisional application No. 63/412,653, filed on Oct. 3, 2022.

(51) Int. Cl.
*A23K 20/158* (2016.01)
*A23K 20/147* (2016.01)

(52) U.S. Cl.
CPC .......... *A23K 20/158* (2016.05); *A23K 20/147* (2016.05)

(58) Field of Classification Search
CPC ...... A23K 20/147; A23K 40/25; A23K 40/30; A23K 20/158; A23K 10/20; A23K 50/42; A23K 10/30; A23K 20/174; A23K 40/20; A23K 20/163; A23K 50/48; A23K 10/26; A23K 10/18; A23K 20/10; A23K 20/20; A23K 20/179; A23K 50/40; A23K 10/16; A23K 10/00; A23K 50/45; A23K 20/105; A23K 20/111; A23K 40/00; A23K 20/00; A23K 20/121; A23K 30/00; A23K 40/10; A23K 10/22; A23K 20/26; A23K 20/30;
(Continued)

(56) References Cited

U.S. PATENT DOCUMENTS

| | | | | |
|---|---|---|---|---|
| 2010/0330251 | A1* | 12/2010 | Weakley ................ | A23K 40/20 426/601 |
| 2014/0227386 | A1 | 8/2014 | Niceron et al. | |

(Continued)

FOREIGN PATENT DOCUMENTS

| | | | |
|---|---|---|---|
| WO | 2010008452 | | 1/2010 |
| WO | 2015173602 | A1 | 11/2015 |

OTHER PUBLICATIONS

International Search Report and Written Opinion to PCT application PCT/IB2023/059244 dated Apr. 1, 2024.

(Continued)

*Primary Examiner* — Vera Stulii

(57) ABSTRACT

A pet food product can include a dry pet food kibble; a modified fat which contains a first lipid and also contains a second lipid such that the modified fat has at least one property which is increased relative to the first lipid, the at least one increased property selected from the group consisting of hardness, crystallinity, viscosity, and solid fat content; a liquid digest on the dry pet food kibble and/or the modified fat; and a dried animal digest on at least one of the dry pet food kibble, the modified fat, and the liquid digest.

12 Claims, 10 Drawing Sheets

(58) Field of Classification Search
CPC ........ A23K 50/50; A23K 10/24; A23K 10/37; A23K 10/38; A23K 20/137; A23K 20/142; A23K 20/22; A23K 20/24; A23K 30/20; A23K 50/10; A23K 50/30; A23K 50/70; A23K 50/75; A23K 50/80
See application file for complete search history.

(56) References Cited

U.S. PATENT DOCUMENTS

| | | | |
|---|---|---|---|
| 2015/0056347 | A1 | 2/2015 | Fournier et al. |
| 2016/0235094 | A1 | 8/2016 | Mao et al. |

OTHER PUBLICATIONS

Reveret, Impact of Fat Coating Procedure on Powder Palatant Availability and Performance in Cats, SPF Palatability No. 1 Worldwide, 2014.

* cited by examiner

FIG. 5A
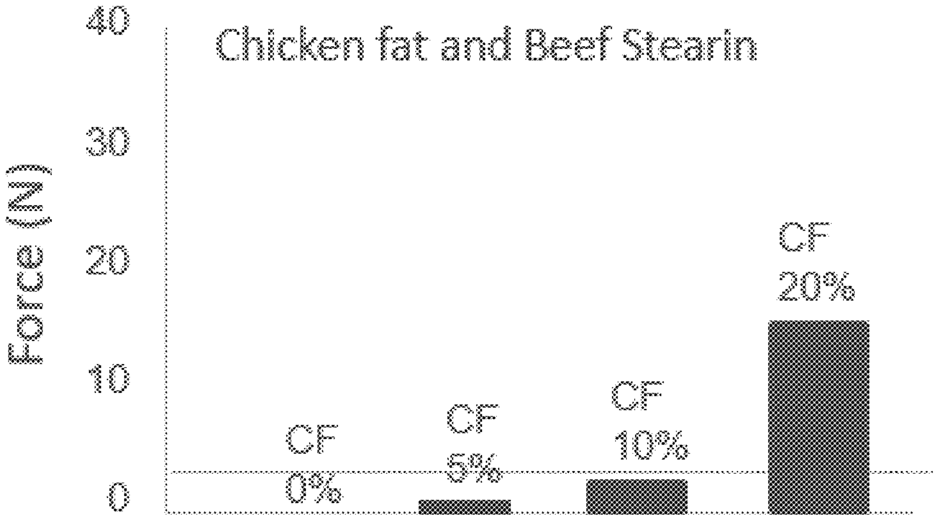
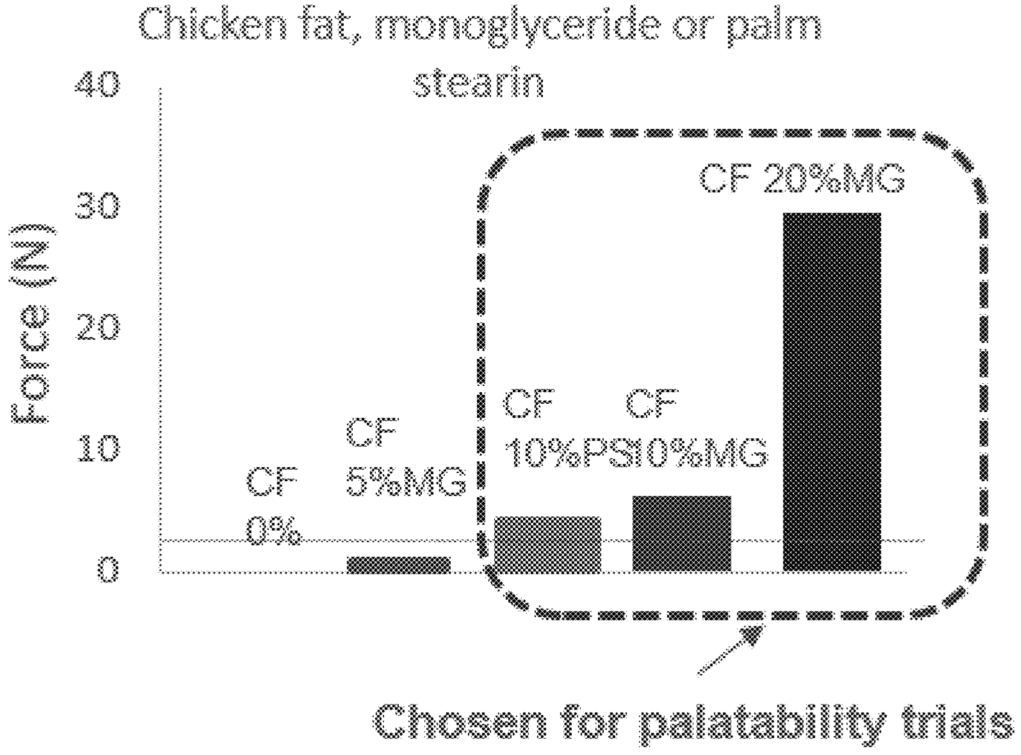
FIG. 5B

PALATABILITY ENHANCEMENT OF DRY PET FOODS BY FAT MODIFICATION

CROSS REFERENCE TO RELATED APPLICATION

This application claims priority to U.S. Provisional Application Ser. No. 63/412,653 filed Oct. 3, 2022 the disclosure of which is incorporated in its entirety herein by this reference.

BACKGROUND

The main pet food categories are dry, semi-moist, and wet. Of these three categories, dry pet foods are perceived as the least palatable. To increase palatability of dry pet foods, one approach is to apply at least one of a fat or a hydrolysate (also known as "digest") to the dry pet foods.

SUMMARY

For dry pet food kibbles coated with fat and digest, the present inventors hypothesized that penetration of the fat to the kibble interior, and/or inter-diffusion of the fat with the digest, decreases palatability. To avoid fat penetration, the present inventors added fat modifiers which increase fat hardness (e.g., of poultry fat). As discussed in more detail later herein, the present inventors surprisingly found that addition of fat modifiers, such as saturated monoglycerides and palm stearin, increases crystallinity and hardness of the fat, decreases inter-diffusion, and thereby increases palatability.

Addition of monoglyceride or palm stearin to a liquid phase increases the hardness of the liquid phase, which can increase fat hardness and decrease fat diffusion and fat exchanges. However, to the best knowledge of the present inventors, it was not known prior to the present disclosure that this fat modification would be effective with dried pet food, prevent fat migration and, more importantly, increase palatability. Indeed, fat migration and interaction with digest has been reported to decrease dried cat food palatability. And in such reports, only physical means and deposition processes have been used to monitor interactions of fat with other layers, and fat has not been modified by use of additives.

Moreover, unsaturated monoglycerides have been used to create self-assembled structures in the fat of dried kibbles to perform a Maillard reaction, but embodiments according the present disclosure employ saturated monoglycerides to significantly increase viscosity to thereby lower fat diffusion and exchanges between layers, which would not be achieved by unsaturated monoglycerides, and which is a distinct mechanism from the Maillard reaction.

Accordingly, an aspect of the present disclosure is a pet food product comprising the following four components:

(i) a dry pet food kibble (preferably an extrudate comprising at least one of protein, carbohydrate, or fat);

(ii) a modified fat which comprises a first lipid (preferably crystallizing in a β or β' crystal, such as beef tallow, pork lard, and/poultry fat) and further comprises a second lipid (preferably crystallizing in a β or β' form, such as at least one of saturated monoglyceride or palm stearin) such that the modified fat has at least one property which is increased relative to the first lipid, the at least one increased property selected from the group consisting of hardness, crystallinity, viscosity, and solid fat content;

(iii) a liquid digest (preferably a liquid hydrolysate of animal by-products) on the dry pet food kibble and/or the modified fat; and (iv) a dried animal digest (preferably a dried hydrolysate of animal by-products) on at least one of the dry pet food kibble, the modified fat, or the liquid digest.

Another aspect of the present disclosure is a method of enhancing palatability of a dry pet food kibble, the method comprising:

(a) applying any modified fat disclosed herein on the dry pet food kibble;

(b) applying liquid digest to the dry pet food kibble and/or the modified fat, simultaneously to step (a) or within a predetermined time thereafter (e.g., about one second to about one minute afterward, preferably about 2 seconds afterward); and (c) applying dried digest to at least one of the dry pet food kibble, the modified fat, and the liquid digest, simultaneously to step (b) or within a predetermined time thereafter (e.g., about one second to about one minute afterward, preferably about 2 seconds afterward).

Yet another aspect of the present disclosure is a pet food product made by any method disclosed herein.

An advantage of one or more embodiments disclosed herein is to produce dry pet foods by extrusion to form kibbles, which are subsequently coated with fats and digests to enhance palatability.

Another advantage of one or more embodiments disclosed herein is to increase palatability of dried pet food by modifying the fat on the dried pet food so that the modified reduces penetration of the fat into the kibble interior and does not interdiffusion with digest applied to the fat.

Yet another advantage of one or more embodiments disclosed herein is to increase the palatability of dried pet food without creating hygiene issues during manufacturing due to clumping and line clogging.

Still another advantage of one or more embodiments disclosed herein is to reduce the level of fat used in coatings of dried pet food.

Moreover, one or more embodiments disclosed herein provide a new approach to palatability enhancement across both cat and dog foods.

Additional features and advantages are described herein and will be apparent from the following Detailed Description and the Figures.

BRIEF DESCRIPTION OF THE FIGURES

FIGS. 4, 5A, 5B and 6-11 depict results from the non-limiting experimental examples disclosed herein.

DETAILED DESCRIPTION

Figure 1:
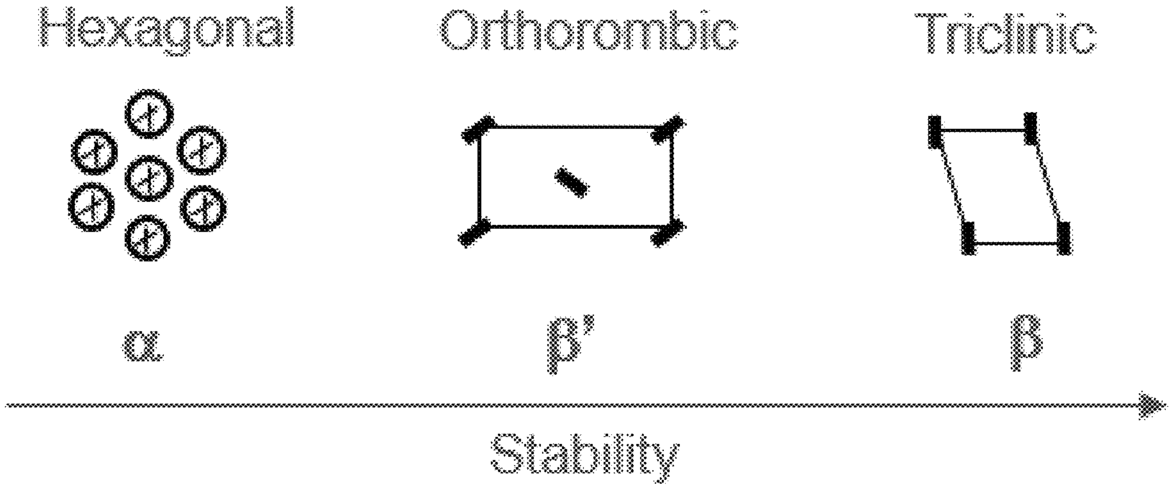
FIG. 1 is a schematic diagram generally illustrating lipid hardness based on polymorphic phase.

As used in this disclosure and the appended claims, the singular forms "a," "an" and "the" include plural referents unless the context clearly dictates otherwise. Thus, for example, reference to “a fat” or “the fat” includes a single fat and also two or more fats.

The words “comprise,” “comprises” and “comprising” are to be interpreted inclusively rather than exclusively. Likewise, the terms “include,” “including” and “or” should all be construed to be inclusive, unless such a construction is clearly prohibited from the context. However, the compositions disclosed herein may lack any element that is not specifically disclosed. Thus, a disclosure of an embodiment using the term “comprising” includes a disclosure of embodiments “consisting essentially of” and “consisting of” the components identified. Similarly, the methods disclosed herein may lack any step that is not specifically disclosed herein. Thus, a disclosure of an embodiment using the term “comprising” includes a disclosure of embodiments “consisting essentially of” and “consisting of” the steps identified. Any embodiment disclosed herein can be combined with any other embodiment disclosed herein.

The terms “at least one of” and “and/or” used respectively in the context of “at least one of X or Y” and “X and/or Y” should be interpreted as “X without Y,” or “Y without X,” or “both X and Y.” Where used herein, the terms “example” and “such as,” particularly when followed by a listing of terms, are merely exemplary and illustrative and should not be deemed to be exclusive or comprehensive.

All percentages expressed herein are by weight of the total weight of the composition unless expressed otherwise. Ranges are used herein in shorthand to avoid listing every value within the range. Any appropriate value within the range can be selected as the upper value or lower value of the range. Moreover, the numerical ranges herein include all integers, whole or fractions, within the range.

As used herein, “about” is understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number.

The terms “food,” “food product” and “food composition” mean a product or composition that is intended for ingestion by an animal and provides at least one nutrient to the animal. The term “animal” or “pet” means any animal which could benefit from or enjoy the food compositions and products provided by the present disclosure. The pet can be an avian, bovine, canine, equine, feline, hircine, lupine, murine, ovine, or porcine animal. The pet can be any suitable animal, and the present disclosure is not limited to a specific pet animal. The term “companion animal” means a dog or a cat.

The term “pet food” means any composition formulated to be consumed by a pet. A “dry” food composition has equal to or less than 11.5 wt. % moisture and/or a water activity less than 0.64, preferably both. A “semi-moist” food composition has greater than 11.5 wt. % moisture, and up to 20 wt. % moisture, and/or a water activity of 0.64 to 0.75, preferably both. A “wet” food composition has more than 20 wt. % moisture and/or a water activity higher than 0.75, preferably both.

“Kibbles” are pieces of dry pet food which can have a pellet shape or any other shape, and in preferred embodiments, are extruded compositions. Non-limiting examples of kibbles include particulates; pellets; pieces of pet food, dehydrated meat, meat analog, vegetables, and combinations thereof; and pet snacks, such as meat or vegetable jerky, rawhide, and biscuits. The present disclosure is not limited to a specific form of the kibbles. As used herein, the term “kibble” does not encompass any coating on the kibble.

“Palatability” refers to a quality of a comestible composition that makes it appealing or pleasing to one or more of an animal’s senses, particularly the senses of taste and smell. As used herein, whenever an animal shows a preference, for example, for one of two or more foods, the preferred food is more “palatable” and has greater “palatability.” For companion animals and other non-human animals, the relative palatability of one food compared to one or more other foods can be determined, for example, in side-by-side, free-choice comparisons, e.g., by relative consumption of the foods, or other appropriate measures of preference indicative of palatability. The terms “enhanced palatability” and “enhancing palatability” mean that a food product prepared according to the present disclosure, which comprises a modified fat, is more palatable than a food product which instead contains the unmodified fat but is otherwise identically formulated.

As used herein, the terms “digest” and “hydrolysate” refer to the product which results from hydrolysis of a substrate. The selection of a suitable substrate is based on the desired characteristics attained by the hydrolysate at the end of the process, specifically in terms of organoleptic properties and nutritional values. The substrate is preferably a non-milk protein substrate, more preferably an animal protein, even more preferably tissue from a farm animal such as poultry (e.g., any species or kind of bird, preferably chicken, turkey, or duck), beef, pork, or lamb, or from a seafood animal, such as shrimp, fish or shellfish. In a particularly preferred embodiment, the substrate is viscera from chicken. A hydrolysate of animal protein is also referred to as an “animal digest” herein.

In an embodiment, the animal protein can be viscera obtained from any suitable source. Typically, viscera include the soft internal organs of the body, for example lungs, spleen, kidneys, brain, livers, low-temperature partially-defatted fatty tissue, and stomachs and intestines, freed of their contents; especially those organs contained within the abdominal and thoracic cavities. Additionally or alternatively to soft internal organs, viscera can include blood and/or bone. One example of the definition of viscera is given by the Association of American Feed Control Officials, Inc. (AAFCO). AAFCO generally defines viscera as all the organs in the three great cavities of the body (abdominal, thoracic, and pelvic) but defines viscera for fish as all organs in the great cavity of the body, including the gills, heart, liver, spleen, stomach, and intestines. Similarly, AAFCO defines viscera for mammals as all organs in the great cavity of the body, including the esophagus, heart, liver, spleen, stomach, and intestines, but excludes the contents of the intestinal tract and defines viscera for poultry as all organs in the great cavity of the body, including the esophagus, heart, liver, spleen, stomach, crop, gizzard, undeveloped eggs, and intestines. In various embodiments, the viscera may be pretreated as known to skilled artisans, e.g., by stirring, homogenizing, emulsifying, and the like.

In some embodiments, the digest is made by endogenous proteases and/or exogenous proteases, which may hydrolyze the substrate using any method known to skilled artisans. In preferred embodiments, a substrate-protease mixture is heated to increase enzyme activity and hydrolysis rate. The substrate-protease mixture can be heated using any suitable method, e.g., by direct steam injection, indirect heating via the vessel wall, or indirect steam heating in a jacketed vessel. Other methods are known to skilled artisans, e.g., heat exchangers. In an embodiment, the substrate-protease mixture is heated to about 35 °C. to about 75 °C. for a time period from about 0.25 hours to about 4 hours, preferably about 0.5 hours to about 2 hours, and most preferably about 0.5 hours to about 1 hour.

Preferably the hydrolysate is formed by endogenous proteases from the substrate. However, these embodiments can additionally or alternatively comprise adding one or more exogenous proteases to the substrate. Any protease that is compatible with the substrate and that increases protein hydrolysis can be added. The protease can be any enzyme that is predominantly a protease, and the protease can have side activities such as lipolytic activity and/or phosphatasic activity.

The exogenous proteases can be an exopeptidase (e.g., Flavourzyme®), such as an aminopeptidase, a carboxypeptidase, and a combination thereof; and/or an endopeptidase, such as trypsin, chymotrypsin, papain, elastase, Alcalase®, Protamex®, Neutrase®, and combinations thereof. In various embodiments, the exogenous proteases are added in amounts from about 0.01 to about 4%, preferably from about 0.05 to about 0.2%, most preferably from about 0.1 to about 1% by weight of the substrate-protease mixture. The exogenous proteases can be added to the mixture using any suitable method, generally by pouring the proteases into the mixture with stirring.

The methods and compositions and other advances disclosed herein are not limited to particular methodologies, protocols, and reagents because, as the skilled artisan will appreciate, they may vary. Further, the terminology used herein is for the purpose of describing particular embodiments only and does not limit the scope of that which is disclosed or claimed.

Unless defined otherwise, all technical and scientific terms, terms of art, and acronyms used herein have the meanings commonly understood by one of ordinary skill in the art in the field(s) of the present disclosure or in the field(s) where the term is used. Although any compositions, methods, articles of manufacture, or other means or materials similar or equivalent to those described herein can be used, the preferred devices, methods, articles of manufacture, or other means or materials are described herein.

Figure 2:
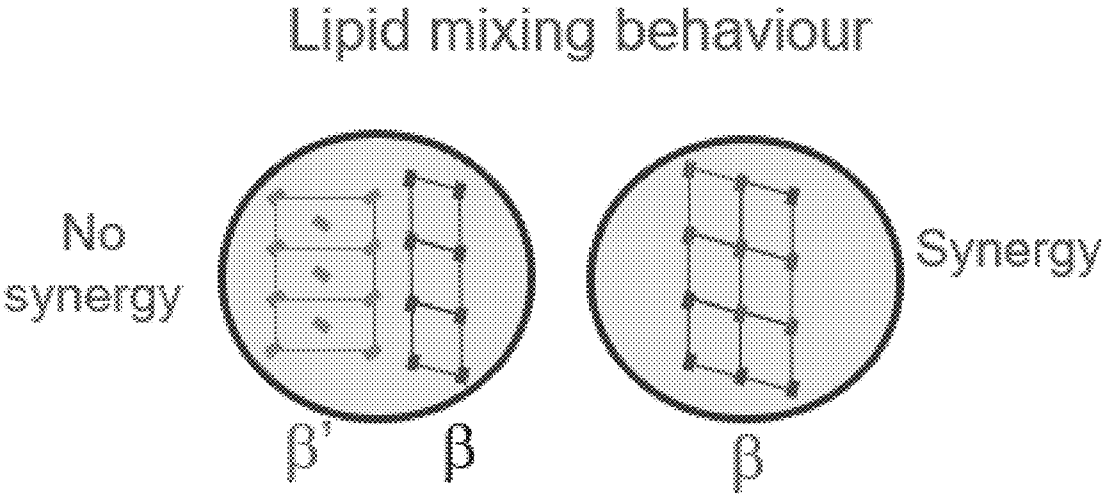
FIG. 2 is a schematic diagram generally illustrating lipid mixing behavior based on polymorphic phases of the two mixed lipids. Best properties are obtained when the two lipids exhibit the same polymorph crystalline structure β or β', preferably β.

Preferred embodiments provided by the present disclosure are described hereafter, but as a preliminary background, the present disclosure first generally discusses the scientific principles believed by the inventors to be relevant to the present disclosure. As shown in FIG. 1, phases of fat which are more stable will confer hardness and lower exchanges. In this regard, the three main polymorphic forms of fat, from least stable to most stable, are alpha ($\alpha$), which has a hexagonal unit cell; beta prime ($\beta'$), which is orthorhombic; and beta ($\beta$), which is triclinic. As shown in FIG. 2, for lipid mixing behavior, two fats with beta prime ($\beta'$) and beta ($\beta$) structures typically do not display synergy for stability, while mixing two fats with the same structure ($\beta$ or $\beta'$) typically provides stability synergy.

Figure 3:
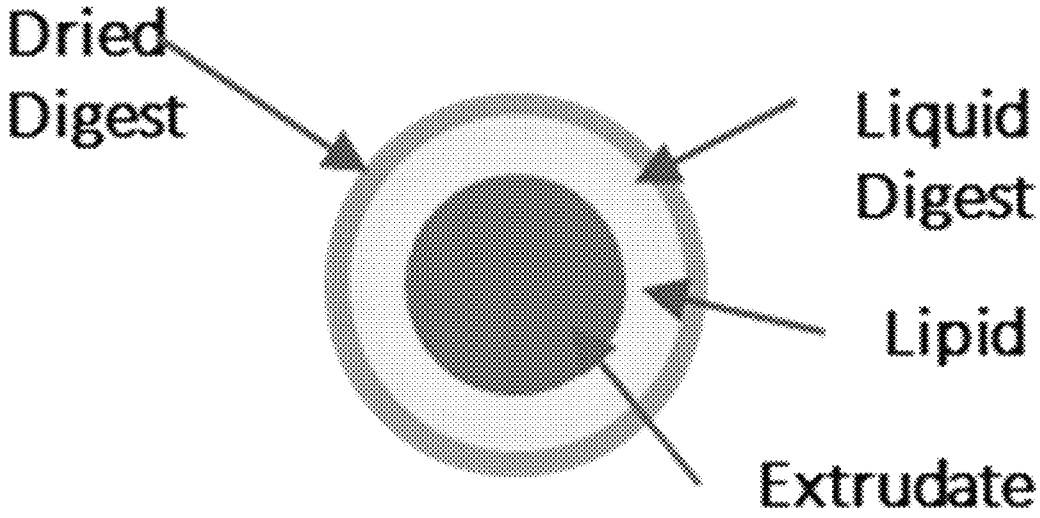
FIG. 3 is a non-limiting schematic diagram of an embodiment of a pet food product according to the present disclosure.

Therefore, for crystal modification, particularly preferred embodiments according to the present disclosure employ a mixture of the same polymorphs ($\beta$ or $\beta'$, preferably $\beta$) lipids, such as chicken fat and at least one of saturated monoglyceride or palm stearin. FIG. 3 shows a schematic diagram of a preferred embodiment of a food product according to the present disclosure, in which the food product comprises dried kibble; then a first layer on the kibble, and the first layer comprises modified fat; then a second layer on the modified fat, and the second layer comprises liquid digest; and then a third layer on the liquid digest, and the third layer comprises dried digest. As used herein, "layer" does not imply that the layers are completely distinct, and in some embodiments, indeed the components of one or more of the layers may be present in one or more of the other layers.

For example, in some embodiments, greater than 50 wt. % of the dried digest in the food product is exterior to the liquid digest, preferably greater than 60 wt. % of the dried digest in the food product is exterior to the liquid digest, more preferably greater than 70 wt. % of the dried digest in the food product is exterior to the liquid digest, even more preferably greater than 80 wt. % of the dried digest in the food product is exterior to the liquid digest, and most preferably greater than 90 wt. % of the dried digest in the food product is exterior to the liquid digest.

Additionally or alternatively, in some embodiments, greater than 50 wt. % of the liquid digest in the food product is between the dried digest and the kibble, preferably greater than 60 wt. % of the liquid digest in the food product is between the dried digest and the kibble, more preferably greater than 70 wt. % of the liquid digest in the food product is between the dried digest and the kibble, even more preferably greater than 80 wt. % of the liquid digest in the food product is between the dried digest and the kibble, and most preferably greater than 90 wt. % of the liquid digest in the food product is between the dried digest and the kibble.

Figure 4:
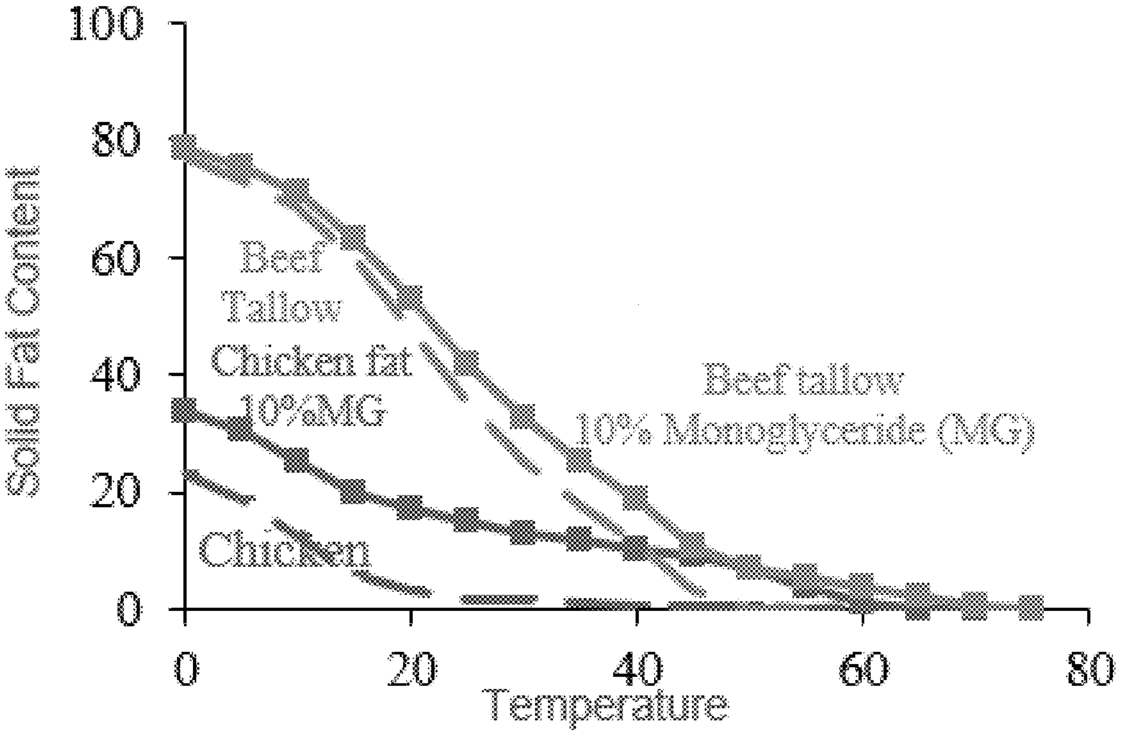

As shown in FIG. 4, addition of 10% saturated monoglycerides (relative to total lipid in the coating layers) to chicken fat, presence of beta structure, significantly increased solid fat content relative to the chicken fat without the saturated monoglycerides. In contrast, addition of saturated monoglycerides to beef tallow, which contains mainly beta prime structure under the conditions of the present disclosure, had the substantially same solid fat content as beef tallow without the saturated monoglycerides.

Furthermore, to analyze hardness linked to fat exchanges, increasing amounts of chicken fat were added to beef stearin and thereby increased hardness (FIG. 5A), and chicken fat was mixed with palm stearin or saturated monoglycerides, which was accompanied by increased hardness (FIG. 5B).

Furthermore, an experimental example used saturated monoglycerides, palm stearin and beef stearin, and X-ray tomography and scanning electron microscopy (SEM) demonstrated that replacing chicken fat (CF) by tallow, which is much more crystalline than CF, leads to much less penetration of fat into the kibble interior. SEM images further showed that addition of 5% or 10% of saturated monoglyceride (relative to total lipid in the coating layers of modified fat, liquid digest and dried digest) to the coating fats reduced fat penetration into the kibbles.

Then a first palatability trial demonstrated that conditions leading to fat migration decrease palatability, and conditions reducing fat migration increase palatability. Therefore, without being bound by any theory, it is very likely that modification of the fat that will make it more crystalline (e.g., adding saturated monoglyceride or stearins) will increase palatability.

Figure 6:
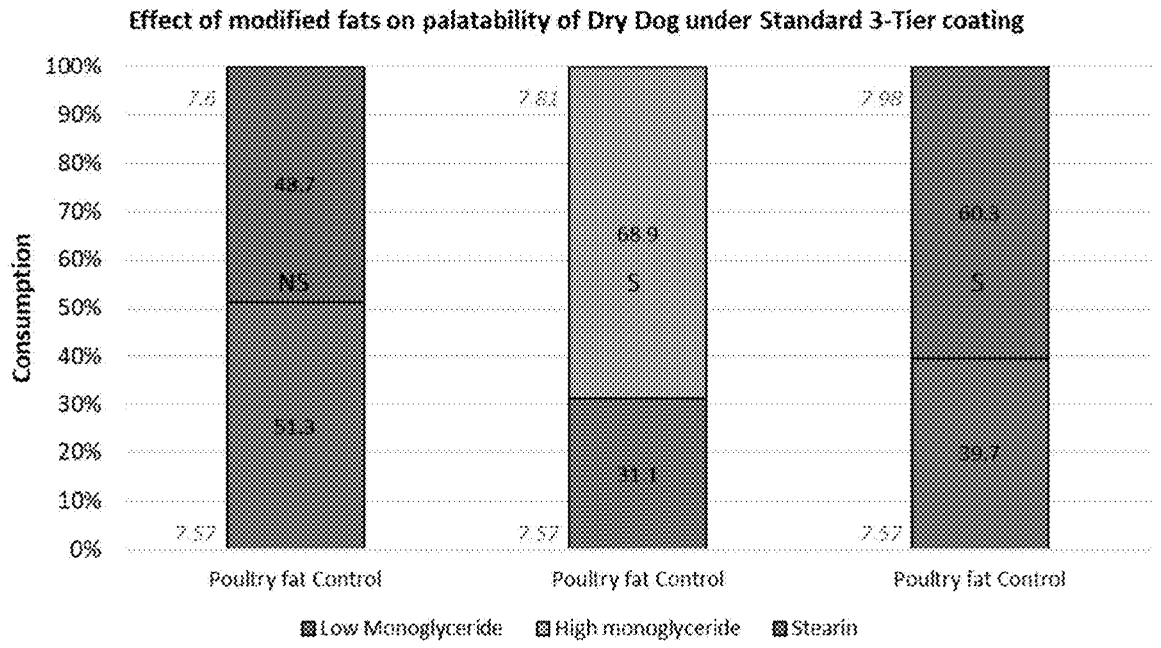

Increased palatability from addition of modifiers that solidify the fat was further demonstrated by a second palatability trial. In this trial, saturated monoglycerides or palm stearin were used to modify fats (i.e., chicken and beef fats) to make the fat become harder, with the objective to limit diffusion. FIG. 6 shows the results from the first and second experiments in the second palatability trial ("low monoglycerides"=5 wt. % saturated monoglycerides relative to total lipid in the coating layers on the kibble, "high monoglycerides"=16 wt. % saturated monoglycerides relative to total lipid in the coating layers on the kibble).

In the first experiment for the second palatability trial, the following sequence of coating was deposited onto the kibbles (animal extrudate). For the reference sample, the following sequence was applied: first, 6% poultry fat (at 60 °C.); second, 2% liquid animal digest (LAD); and third, 2% of dried animal digest (DAD). This process is referenced herein as "three tier" coating, i.e., a layer of fat or modified fat on the kibble, then a layer of LAD on the fat or modified fat, then a layer of DAD on the layer of LAD.

For the modified fat sample, 5.4% poultry fat was first mixed with 0.6% palm stearin at 60 °C. to form the lipid mixture. Palm stearin is from palm oil which is fractionated so that it becomes harder. The present inventors found that palm stearin can be mixed with another fat (e.g. chicken fat, lard, tallow) and has great ability to increase the hardness of the other fat, and as hypothesized by the present inventors, can limit interdiffusion. For the modified fat sample, the following sequence was applied onto the kibbles: first, 6% of the lipid mixture (formed of 5.4% poultry fat and 0.6% palm stearin); second, 2% liquid animal digest (LAD); and third, 2% of dry animal digest (DAD).

The pet foods prepared were used in paired tests for palatability, which involve placing the two types of foods in separate bowls and offering them to the pet. The more palatable or preferred food is more consumed over a specific period.

The product coated with standard poultry fat was provided in one bowl, and the product with modified fat (poultry fat and palm stearin) was provided in the other bowl. It was found that there was significant preference ($p<0.05$) for the kibble containing the modified fat, because the dogs ate more of the product with the modified fat than the reference.

In a second experiment for the second palatability trial, the following sequence of coating was applied to the kibble. For the reference sample: first, 6% poultry fat (at 60 °C.); second, 2% LAD; and third, 2% of DAD. For the modified sample: 5% poultry fat was first mixed with 1% saturated monoglyceride (Dimodan® HR) at 70 °C. to form the lipid mixture. This was applied onto the kibbles followed by 2% LAD and 2% DAD. The palatability tests were conducted as described earlier. The results showed 70/30 preference for the kibble containing modified fat (poultry fat and HIGH monoglycerides).

In a third experiment for the second palatability trial (results in FIG. 6), a different sequence of deposition was used. For the reference sample: first, 6% poultry fat (at 60 °C.) at the same time as the LAD; and second, 2% DAD. For the modified fat, 5.4% poultry fat was first mixed with 0.6% palm stearin at 60 °C. to form the lipid mixture. This lipid mixture was substantially simultaneously applied onto the kibbles as 2% LAD (i.e., about two seconds afterward). Then 2% DAD was applied to the kibble which was already at least partially coated with LAD. The palatability test again showed that the dogs had preference for the kibble with modified fats (60/40).

X-ray tomography was performed and image analysis conducted to quantify fat that has diffused in the kibble interior. The amounts of fat that diffused into the kibbles were 9% and 26% for the modified fat and standard poultry fat, respectively. This result confirms the hypothesis that fat interdiffusion was more limited when using a modified fat.

Figure 7:
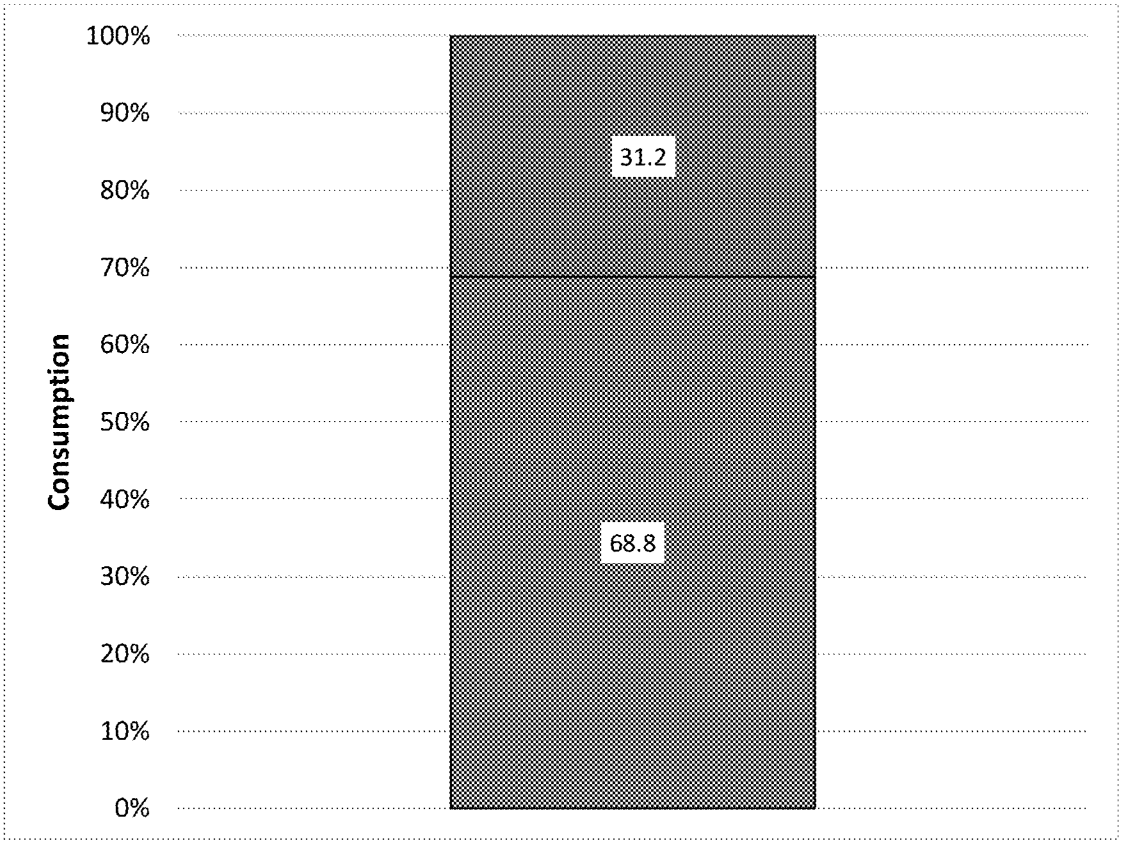

In a third palatability trial (results in FIG. 7), the fat and the LAD were applied almost simultaneously in a continuous process (i.e., about two seconds afterward). Specifically, for a given kibble, LAD is deposited while only part of the fat has been deposited, allowing for some degree of interdiffusion. After both fat and LAD were deposited, DAD was applied.

In a first experiment for the third palatability trial, the modified fat consists in 5.4% poultry fat and 0.6% palm stearin. Kibbles with this modified fat were compared to kibbles with standard poultry fat (6% poultry fat). It was found that there was 69/31 preference by dogs for the kibble containing the modified fat (poultry fat and palm stearin). This result means that dogs ate about 2.3 times more of the product with the modified fat than the reference.

Figure 8:
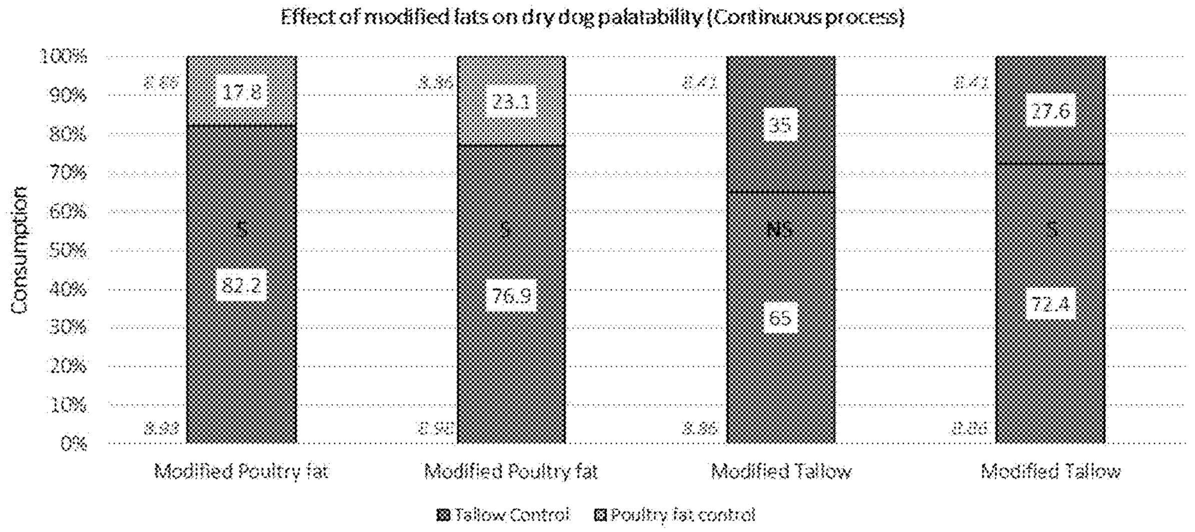

In a second experiment for the third palatability trial, the modified fat consists of 5.4% beef fat and 0.6% palm stearin. Kibbles with this modified fat were compared to those with standard tallow (6% beef fat). Results showed 72/28 preference (FIG. 8) for the product with modified fat (tallow and palm stearin). This result means that dogs ate about 2.5 times more the product with the modified fat than the reference.

Figure 9:
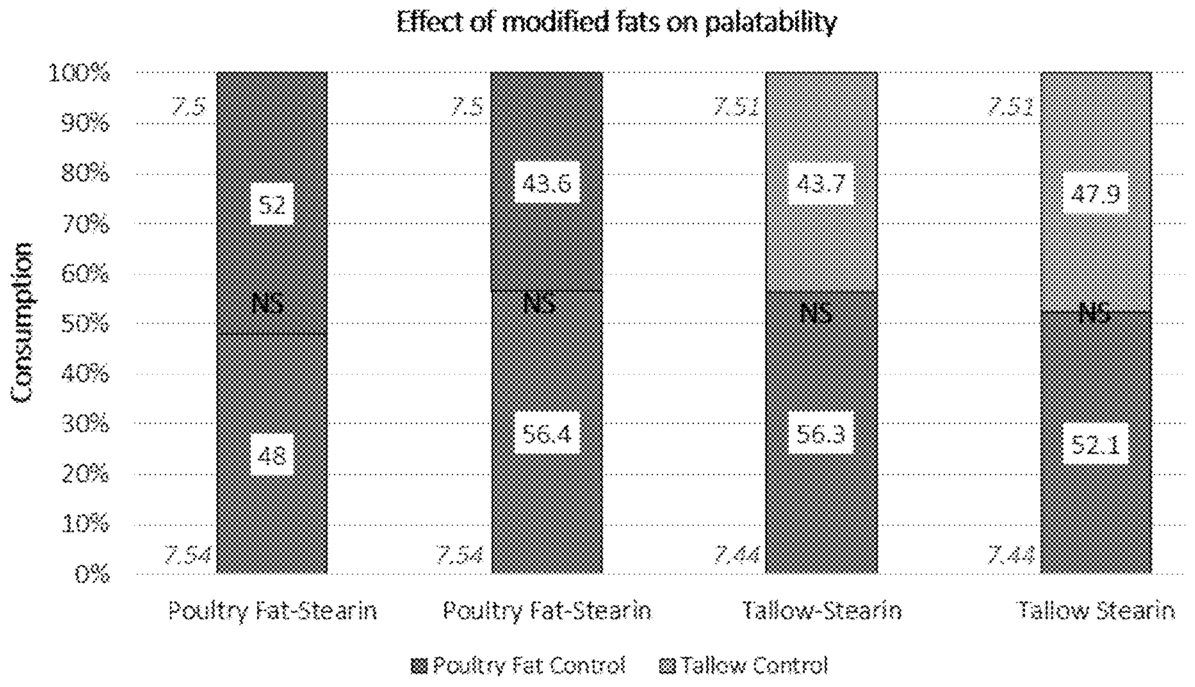
Figure 10:
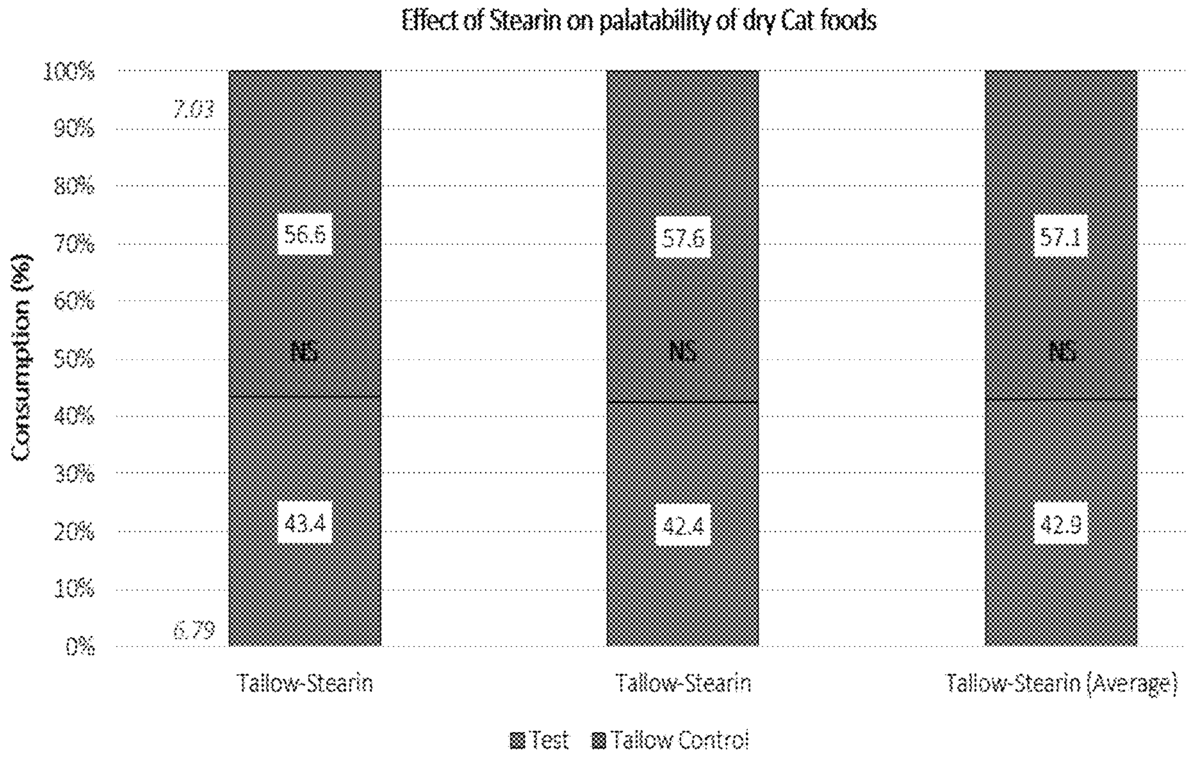

A fourth palatability trial (results in FIGS. 9 and 10) investigated deposition of only one kind of digest ("two tier" coating, i.e., a layer of fat or modified fat on the kibble, and then a layer of DAD on the fat or modified fat, without the LAD between). Specifically, the results discussed above showed significant palatability improvement of dry dog foods when stearin-modified fats were used in three tier coatings, so a study was executed to further explore effect of such stearin-modified fats on the palatability of dry dog foods and dry cat foods subjected to two tier coating with fat and DAD. In FIGS. 9 and 10, each bar represents feedings with two pets pet panel.

In the control coating in the two tier system for cat food, the kibbles were 89.4 wt. % of the coated kibble, edible beef tallow was 8.5 wt. % of the coated kibble, and DAD was 2.1 wt. % of the coated kibble. In the stearin-modified test coating in the two tier system, the kibbles were 89.4 wt. % of the coated kibble, edible beef tallow was 7.65 wt. % of the coated kibble, palm stearin was 0.85 wt. % of the coated kibble (making up 10 wt. % of fat in the coating layers), and DAD was 2.1 wt. % of the coated kibble.

In the control coating in the two tier system for dog food, the kibbles were 92 wt. % of the coated kibble, poultry fat or tallow was 6.0 wt. % of the coated kibble, and DAD was 2.0 wt. % of the coated kibble. In the stearin-modified test coating in the two tier system, the kibbles were 92 wt. % of the coated kibble, poultry fat or tallow was 5.4 wt. % of the coated kibble, palm stearin was 0.6 wt. % of the coated kibble (making up 10 wt. % of fat in the coating layers), and DAD was 2.0 wt. % of the coated kibble.

For the reference sample, the following sequence was applied on the kibbles: first, 6% poultry fat (at 60 °C.); and then 2% of dried animal digest (DAD) were deposited. For the modified fat: 5.4% poultry fat was first mixed with 0.6% palm stearin at 60 °C. to form the lipid mixture, and the following sequence was applied on the kibbles: first, poultry fat mixed with palm stearin (at 60 °C.); and then 2% of dried animal digest (DAD). Palatability test results with dogs (FIG. 9) and cats (FIG. 10) both showed no significant difference (about 50/50) between kibbles coated with poultry fat and modified poultry fat when DAD was applied to the fat without the LAD.

Figure 11:
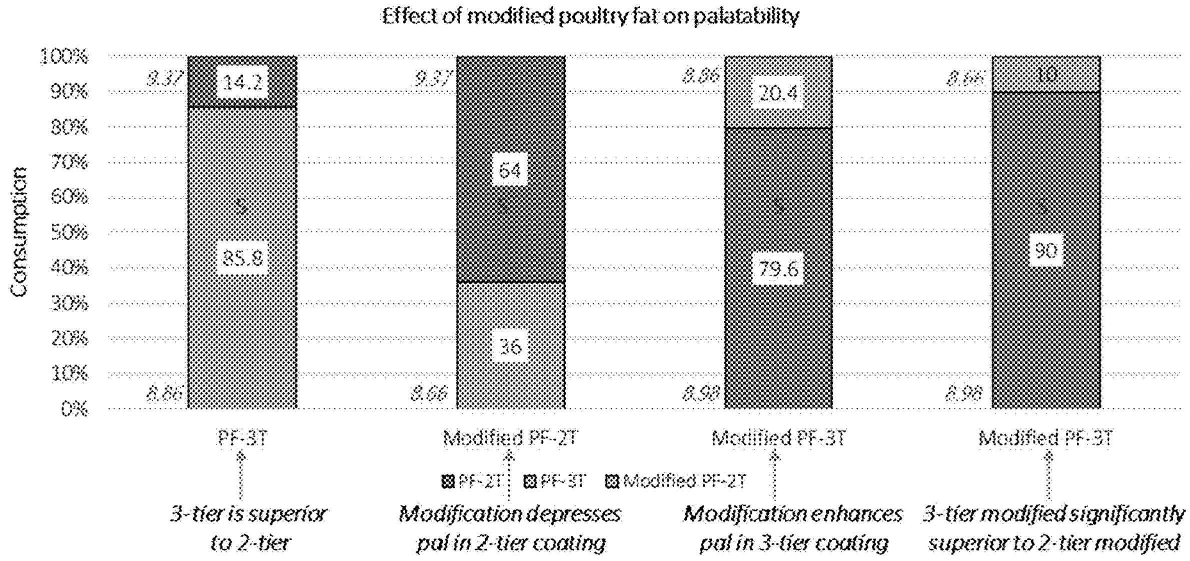

A fifth palatability trial (results in FIG. 11) investigated both "two tier" coating and "three tier" coating. As shown in the first bar (on the far left), two tier coating was compared to three tier coating with both using unmodified poultry fat, and three tier coating is superior to two tier coating when using unmodified poultry fat. As shown in the second bar, two tier coating with unmodified fat was compared to two tier coating with modified poultry fat, and modified poultry fat actually depresses the palatability relative to unmodified poultry fat. This effect is the opposite of what occurred for three tier coating when modified poultry fat was compared to unmodified poultry fat, where fat modification enhanced palatability as shown by the third bar. The fourth bar (far right) depicts comparison of three tier coating including modified fat, to two tier coating using modified fat, and shows that the three tier coating with modified fat was significantly superior to the two tier coating with modified fat. Therefore, without being bound by any particular theory, the present inventors believe the DAD in the third layer of the three tier coating binds on top of the LAD to hold the LAD on the kibble and thereby increase palatability relative to the two tier coating.

Accordingly, an aspect of the present disclosure is a food product comprising the following four components:

(i) a dry pet food kibble (preferably an extrudate comprising at least one of protein, carbohydrate, or fat);
(ii) a modified fat which comprises a first lipid (preferably crystallizing in a β or β' crystal, as it is the case for beef tallow, pork lard, and/poultry fat) and further comprises a second lipid (preferably crystallizing in a β or β' form or more preferably at least one of saturated monoglyceride or palm stearin) that the modified fat has at least one property which is increased relative to the first lipid, the at least one increased property selected from the group consisting of hardness, crystallinity, viscosity, and solid fat content;
(iii) a liquid digest (preferably a liquid hydrolysate of animal by-products) on the dry pet food kibble and/or the modified fat; and
(iv) a dried animal digest (preferably a dried hydrolysate of animal by-products) on at least one of the dry pet food kibble, the modified fat, or the liquid digest.

In some embodiments, the second lipid comprises saturated monoglycerides in an amount of about 0.1 wt. % to about 10.0 wt. % relative to the total food product, preferably about 0.2 wt. % to about 5.0 wt. % relative to the total food product, more preferably about 0.5 wt. % to about 1.5 wt. % relative to the total food product, and most preferably about 1.0 wt. % relative to the total food product. In some embodiments, the second lipid comprises saturated monoglycerides in an amount of about 1.0 wt. % to about 20.0 wt. % relative to the total lipid in the coating layers (i.e., the modified fat, the LAD and the DAD), preferably about 2.5 wt. % to about 18.0 wt. % relative to the total lipid in the coating layers, and most preferably about 5.0 wt. % to about 16.0 wt. % relative to the total lipid in the coating layers.

In some embodiments, the second lipid comprises palm stearin in an amount of about 0.1 wt. % to about 1.0 wt. % relative to the total food product, preferably about 0.2 wt. % to about 0.9 wt. % relative to the total food product, and most preferably about 0.6 wt. % to about 0.85 wt. % relative to the total food product. In some embodiments, the second lipid comprises palm stearin in an amount of about 1.0 wt. % to about 20.0 wt. % relative to the total lipid in the coating layers (i.e., the modified fat, the liquid digest and the dried digest), preferably about 5.0 wt. % to about 15.0 wt. % relative to the total lipid in the coating layers, and most preferably about 10.0 wt. % relative to the total food product.

In some embodiments, the first lipid (e.g., at least one of beef tallow, pork lard, or poultry fat) is about 1.0 wt. % to about 20.0 wt. % of the total food product, preferably about 5.0 wt. % to about 10.0 wt. % of the total food product, and most preferably about 6.0 wt. % to about 8.0 wt. % of the total food product. In some embodiments, the liquid digest is about 0.1 wt. % to about 10.0 wt. % of the total food product, preferably about 1.0 wt. % to about 5.0 wt. % of the total food product, and most preferably about 2.0 wt. % of the total food product. In some embodiments, the dried digest is about 0.1 wt. % to about 10.0 wt. % of the total food product, preferably about 1.0 wt. % to about 5.0 wt. % of the total food product, and most preferably about 2.0 wt. % of the total food product. In some embodiments, the kibble is about 80.0 wt. % to about 98.0 wt. % of the total food product, preferably about 85.0 wt. % to about 95.0 wt. % of the total food product, and most preferably about 90.0 wt. % of the total food product.

In some embodiments, the food product consists essentially of the kibble, the modified fat, the liquid digest, and the dried digest. Optionally, the food product consists of the kibble, the modified fat, the liquid digest, and the dried digest. In some embodiments, the modified fat consists essentially of the first lipid and the second lipid. Optionally, the modified fat consists of the first lipid and the second lipid.

The pet foods disclosed herein can be any food formulated for consumption by a pet such as a dog or cat. In an embodiment, the pet food provides complete nutrition as defined by the Association of American Feed Control Officials (AAFCO) and which depends on the type of animal for which the composition is intended (e.g., a dog or a cat).

In an embodiment, the kibble comprises from about 5% to about 50% crude protein. The crude protein can comprise vegetable proteins, such as whole grain wheat, whole grain corn, soybean meal, soy protein concentrate, corn gluten meal, wheat gluten, cottonseed, and peanut meal; and/or animal proteins, such as casein, albumin, and meat protein. Non-limiting examples of suitable meat protein include beef, pork, lamb, rabbit, equine, poultry, fish, and mixtures thereof. Non-limiting examples of suitable meat meals include rendered and ground parts from beef, pork, lamb, rabbit, equine, poultry, fish, and mixtures thereof. Non-limiting examples of suitable meat include any meat and meat by-product such as whole-carcass beef and mutton; lean pork trim; beef shanks; veal; beef and pork cheek meat; and meat by-products such as lips, tripe, hearts, tongues, mechanically deboned beef, chicken or fish, beef and pork liver, lungs, kidneys, and the like. The meat can be emulsified or particulate. In an embodiment, the meat is chicken.

In an embodiment, the kibble comprises from about 5% to about 40% fat. Non-limiting examples of suitable fats include animal fats and vegetable fats. Preferably the fat source is an animal fat source, for example, beef fat, pork fat, poultry fat. Vegetable oils, such as corn oil, sunflower oil, safflower oil, rape seed oil, soy bean oil, olive oil and other oils rich in monounsaturated and polyunsaturated fatty acids, and medium chain triglycerides can be used.

In an embodiment, the kibble comprises from about 10% to about 60% carbohydrate. Non-limiting examples of suitable carbohydrates include grains or cereals such as rice, corn, millet, sorghum, alfalfa, barley, soybeans, canola, oats, wheat, rye, triticale and mixtures thereof. The compositions can comprise other materials such as dried whey and other dairy by-products.

In an embodiment, the kibble comprises one or more fiber sources. The term “fiber” includes all sources of “bulk” in the food whether digestible or indigestible, soluble or insoluble, fermentable or non-fermentable. Preferred fibers are from plant sources such as marine plants but microbial sources of fiber may be used. Soluble fibers and/or insoluble fibers may be utilized. Non-limiting examples of suitable fiber sources include beet pulp (from sugar beet), gum arabic, gum talha, psyllium, rice bran, carob bean gum, citrus pulp, pectin, fructooligosaccharide, short chain oligofructose, mannanoligofructose, soy fiber, arabinogalactan, galactooligosaccharide, arabinoxylan, and mixtures thereof.

The fiber source can be a fermentable fiber. Fermentable fiber has previously been described to provide a benefit to the immune system of a companion animal. Fermentable fiber or other compositions known to skilled artisans that provide a prebiotic to enhance the growth of probiotics within the intestine may be incorporated into the dry pet food.

In an embodiment, the kibble can comprise at least one vitamin and/or at least one mineral. Non-limiting examples of suitable vitamins include vitamin A, any of the B vitamins, vitamin C, vitamin D, vitamin E, and vitamin K, including various salts, esters, or other derivatives of the foregoing. Non-limiting examples of suitable minerals include calcium, phosphorous, potassium, sodium, iron, chloride, boron, copper, zinc, magnesium, manganese, iodine, selenium, and the like.

In some embodiments, the ash content of the kibble ranges from less than 1% to about 15%, preferably from about 5% to about 10%.

Selection of the amounts of each kibble ingredient is known to skilled artisans. Specific amounts for each additional ingredient will depend on a variety of factors such as the ingredient included in the coating composition; the species of animal; the animal's age, body weight, general health, sex, and diet; the animal's consumption rate; the purpose for which the pet food is administered to the animal; and the like. Therefore, the identity and amounts of the additional ingredients may vary widely and may deviate from the preferred embodiments described herein.

Another aspect of the present disclosure is a method of making a pet food product. In an embodiment, the ingredients of the kibble are milled, for example by a hammer mill. The milled ingredients can be extruded and expanded, and as the ropes exit the extruder they can be cut into kibbles by rotating knives or another suitable cutting device. The kibbles can be dried to a moisture content less than about 20%, preferably less than about 15%, and more preferably less than about 10%.

The dry kibbles can be coated with the modified fat, the liquid digest, and the dried digest, for example by spraying and/or a coating drum or continuous conveyor processing line. Preferably the liquid digest is applied after the modified fat. For example, in a spraying and/or coating drum, the liquid digest is preferably applied about one second to about three minutes after the modified fat is applied to the kibble, more preferably about one second to about two minutes after the modified fat is applied to the kibble, and most preferably about one second to about one minute after the modified fat is applied to the kibble. As another example, in a continuous conveyor processing line, the liquid digest is preferably applied about one second to about ten seconds after the modified fat is applied to the kibble, more preferably about one second to about five seconds after the modified fat is applied to the kibble, and most preferably about one second to about two seconds after the modified fat is applied to the kibble.

Preferably the dried digest is applied after the liquid digest, for example about one second to about one minute after the liquid digest is applied to the modified fat, preferably about one second to about thirty seconds after the liquid digest is applied to the modified fat, more preferably about one second to about ten seconds after the liquid digest is applied to the modified fat, and most preferably about two seconds after the liquid digest is applied to the modified fat.

Then the food products (e.g., the dry kibbles coated with the modified fat, the liquid digest, and the dried digest) can be filled into suitable packaging which is subsequently sealed.

In a general embodiment, the present disclosure provides a method of enhancing palatability of a dry pet food kibble, the method comprising:

(a) applying any modified fat disclosed herein on the dry pet food kibble;

(b) applying liquid digest to the dry pet food kibble and/or the modified fat, simultaneously to step (a) or within a predetermined time thereafter (e.g., about one second to about one minute afterward, preferably about 2 seconds afterward); and (c) applying dried digest to at least one of the dry pet food kibble, the modified fat, and the liquid digest, simultaneously to step (b) or within a predetermined time thereafter (e.g., about one second to about one minute afterward, preferably about 2 seconds afterward).

Yet another aspect of the present disclosure is a food product made by any method disclosed herein.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A pet food product comprising:

a dry pet food kibble;

a modified fat which comprises (i) a first lipid selected from the group consisting of beef tallow, pork lard, poultry fat, and any mixture thereof; and (ii) a second lipid selected from the group consisting of saturated monoglyceride, palm stearin, and any mixture thereof, such that the modified fat has at least one property which is increased relative to the first lipid, the at least one increased property selected from the group consisting of hardness, crystallinity, viscosity, and solid fat content;

a liquid digest on the dry pet food kibble and/or the modified fat; and a dried animal digest on at least one of the dry pet food kibble, the modified fat, and the liquid digest.

2. The pet food product of claim 1, wherein the dry pet food kibble comprises an extrudate comprising at least one of protein, carbohydrate, or fat.

3. The pet food product of claim 1, wherein the first lipid in the modified fat comprises a β' structure and/or a β structure.

4. The pet food product of claim 1, wherein the first lipid in the modified fat comprises poultry fat.

5. The pet food product of claim 1, wherein the second lipid in the modified fat comprises a β structure or a β' structure.

6. The pet food product of claim 1, comprising (a) a first layer, wherein the first layer is positioned directly on the dry pet food kibble and comprises the modified fat; (b) a second layer, wherein the second layer is positioned directly on the modified fat and comprises the liquid digest; and (c) a third layer, wherein the first layer is positioned directly on the liquid digest and comprises the dried digest.

7. The pet food product of claim 1, wherein the first lipid comprises poultry fat, and the second lipid comprises saturated monoglycerides that are at least 10 wt. % relative to total lipid in the modified fat, the liquid digest and the dried animal digest.

8. The pet food product of claim 1, wherein the second lipid comprises saturated monoglycerides that are about 5.0 wt. % to about 16.0 wt. % relative to total lipid in the modified fat, the liquid digest and the dried animal digest.

9. The pet food product of claim 1, wherein the second lipid comprises palm stearin that is about 5.0 wt. % to about 15.0 wt. % relative to total lipid in the modified fat, the liquid digest and the dried animal digest.

10. The pet food product of claim 1, wherein the first lipid is about 6.0 wt. % to about 8.0 wt. % of the food product.

11. The pet food product of claim 1, wherein the liquid digest is about 1.0 wt. % to about 5.0 wt. % of the food product.

12. The pet food product of claim 1, wherein the dried digest is about 1.0 wt. % to about 5.0 wt. % of the food product.

* * * * *